INVENTORS:
Kurt Sauerwein
and
Hans Goedecke

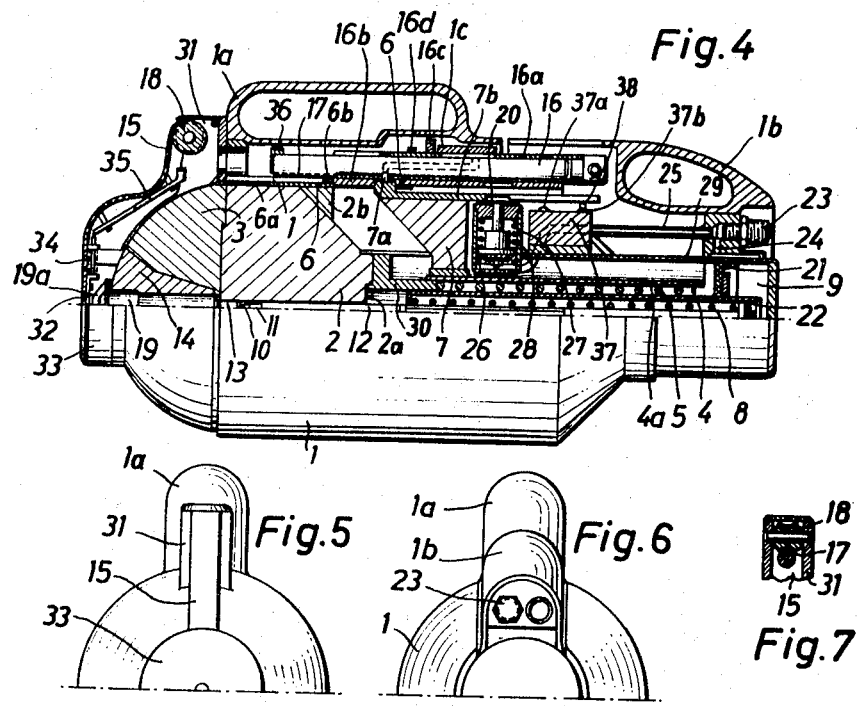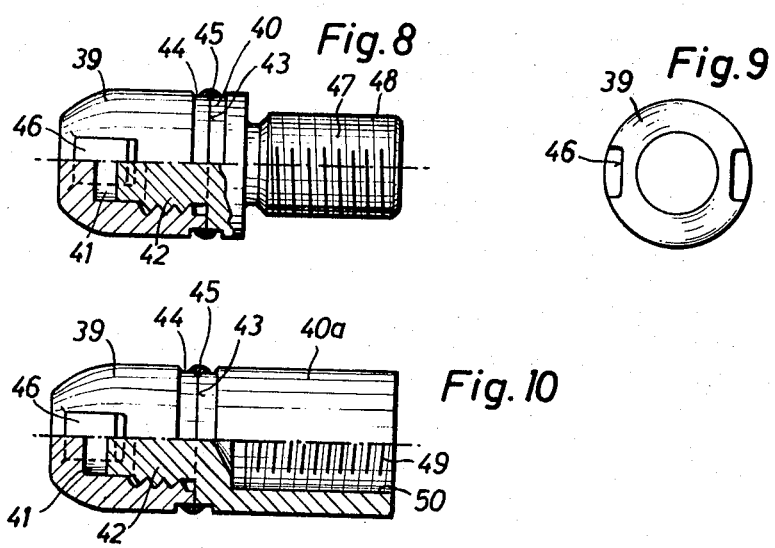

United States Patent Office 3,316,406
Patented Apr. 25, 1967

3,316,406
GAMMA RAY GUN HAVING A TWO-PART SHIELD PROVIDING A DISC-SHAPED EXPOSURE GAP
Kurt Sauerwein, Harffstrasse 148, Dusseldorf, Germany, and Hans Goedecke, Hochdahl, Germany; said Goedecke assignor to said Sauerwein
Filed Oct. 28, 1963, Ser. No. 319,444
Claims priority, application Germany, Oct. 30, 1962, S 82,245
15 Claims. (Cl. 250—106)

This invention relates to guns which produce a controlled beam of gamma rays for testing workpieces. The gamma rays are emitted by a radioactive material such as iridium isotope 192. Such guns are being increasingly employed instead of complicated X-ray guns which are difficult to move and are tied to a source of electric current. A disadvantage of gamma ray guns is their high weight which is due to the necessity of enclosing the radioactive material in a thick protective shield made of a material such as lead or tungsten which absorbs ionizing radiation to a high degree. Conventional gamma ray guns have a capsule of radioactive material which is surrounded by a spherical shield. When it is desired to expose the capsule to produce a beam of gamma rays, the capsule is either moved radially out through a bent passageway in the wall of the shield or the shield is formed in two hemispherical parts which are moved away from one another to form a disc shaped gap. In the first case the gamma rays are emitted in all directions except for the shadow cone formed by the protective shield and in the second case the rays are emitted radially outwards between the two spherical parts of the shield.

In accordance with the present invention a gamma ray gun for use in testing workpieces comprises a protective shield of material which absorbs ionizing radiation and which surrounds a capsule for containing a source of gamma rays, the shield being in two parts separated by a substantial plane of division lying across the end of the casing with one of the parts fixed in the casing and the second part connected to the casing so that it can be moved in the axial direction of the casing away from and towards the first part of the shield between abutments which limit its movement; a cylindrical sleeve which is mounted coaxially in the casing and which is movable in the axial direction against the action of a spring upon the application of fluid under pressure to a chamber within the casing, the sleeve being surrounded by a thrust piece which it carries with it in both directions of movement and which is connected to the second part of the protective shield so that when the sleeve is moved by the fluid pressure the second part of the shield is moved away from the first part to produce a disc shaped gap; and a push rod which is moved coaxially within the sleeve and within a central bore in the first part of the shield against the action of a second spring when the fluid is supplied to the chamber under a greater pressure than that required to move the sleeve against the first spring to move a capsule which is detachably mounted at the end of the push rod out of the bore in the first part of the shield and into a position in which the capsule is situated in the gap between the two parts of the protective shield.

This arrangement for producing a diverging plane of gamma rays is particularly neat and compact and can be made light enough in weight to be handled by one person even if the protective shield is sufficient to screen the radiation from a radioactive source of high intensity such as iridium 192 having an intensity of 50 curies.

The gun is quite easily remote controlled and all that is required for control purposes is a circuit for supplying pneumatic or hydraulic fluid under pressure to the chamber within the casing. In the event of fluid pressure failure, the two springs ensure that the capsule of radioactive material is retracted within the bore in the first part of the shield and that the two parts of the shield come together to close the gap. Since the springs are arranged so that a greater fluid pressure is required to move the push rod and expose the capsule beyond the end of the bore in the first part of the shield than is required to move the second part of the shield away from the first part, the capsule is always moved out of the first part of the shield after, and back into the first part of the shield before, the shield opens and closes the gap respectively.

The second part of the shield is preferably a hemispherical cap provided with a projection which extends into the axial bore in the first part of the shield when the two parts of the shield are together but which, when the two parts are apart to form the gap, acts as a stop for positioning the capsule at the center of the gap. The projection makes doubly sure that in its rest position the capsule is well within the first part of the shield so that in the event of spring failure there is no chance that the capsule will come to rest in the substantial plane of division in the shield. As an even further safety precaution, the substantial plane of division dividing the two parts of the protective shield are preferably curved or offset in step form in opposite directions so that they nest one in the other. In this way, even if the gap is not completely closed, no harmful radiation can penetrate the shield.

In order to give the gun greater versatility, the second part of the protective shield may be formed with a central passageway which extends through it and diverges in the axial direction of the casing away from the end of the axial bore in the first part of the shield, the passageway normally being closed by a plug of material, which absorbs ionizing radiation, carried on the end of an arm which is pivotally connected to the second part of the shield and which carries a fixed pinion engageable by a rack formed on a rotatable slide that moves longitudinally along the casing; the arrangement being such that when the slide is rotated to one position the slide couples the thrust piece to the second part of the shield in such a way that movement of the sleeve against the action of its spring causes the second part of the shield and the plug to move bodily away from the first part of the shield to open the gap, but when the slide is rotated to a second position, it locks the two parts of the protective shield together and couples the thrust piece to the pinion so that when the sleeve is then moved against the action of its spring the rack causes the pinion and arm to be pivoted and the plug to be withdrawn from the passageway in the second part of the protective shield.

When the plug is removed from the passageway in the second part of the shield upon the sleeve being moved by the application of fluid pressure to the chamber, a conical pencil of gamma rays is produced, when the capsule contains a gamma ray source, from the capsule within the axial bore in the first part of the shield and out through the passageway in the second part of the shield. If the pressure to the chamber is then increased sufficiently for the push rod to move the capsule beyond the end of the axial bore in the first part of the shield, the angle of the conical pencil of rays can be increased.

In order to prevent the unintentional removal of the plug from the passageway in the second part of the shield, for example when the rack on the rotary slide is not in mesh with the pinion on the arm, a bolt may be provided which extends through a central hole in the plug and is connected at its inner end to the first part of the shield by means of a bayonet connection. This bolt may also carry the projection which centers the capsule in the gap.

The locking bolt which extends through the plug may be arranged so that when it is withdrawn a narrow passage is formed through the plug to provide access to the capsule in the axial bore in the first part of the shield. A suitable tool can then be inserted in this passage so that the capsule can be removed from the end of the push rod and replaced through the passage.

In order to prevent any forcible exposure of the capsule by opening of the disc-shaped gap between the parts of the shield or by removing the plug from the passageway, a spring loaded locking device may be provided to lock the thrust piece against movement in the casing, the device being disengageable by the application of the fluid under pressure to the chamber in the casing.

The second part of the protective shield may be mounted on the casing by means of a hollow cylindrical shell extension which surrounds the first part of the shield and closes the periphery of the gap between the two parts. When this is the case, for further protection, the outer surface of the part of the cylindrical shell which surrounds the gap when the second part of the shield is moved by the first part of the shield may be distinctively colored and may slide into the casing when the gap is closed so that if any of the colored portion of the shell is visible beyond the end of the casing, it indicates the two parts of the protective shield are not close together. Similarly, the wider end of the passageway through the second part of the protective shield may be surrounded by an outwardly projecting ring which is covered by a hood connected to the plug when the plug is in position within the bore, the outer surface of the ring being distinctively colored so that if any of the colored portion of the ring is visible, this forms an indication that the plug is not fully home within the passageway. Both the distinctive coloring on the part of the cylindrical head and on the outer surface of the ring may be provided by a paint which becomes luminous when exposed to ionizing radiation. The dangerous state of the gun will therefore be clearly recognizable in the dark.

The above described novel gun can be used with known capsules, for holding radioactive material, of the kind which comprise two parts that are inserted one into the other or are screwed together and which enclose a cavity between them. The two parts are frequently soldered or welded together after the radioactive material has been introduced into the cavity. The capsules are usually elongated bodies at one end of which the cavity is located and that the other end of which there is an extension having suitable means for connecting the capsule to the capsule carrier such as the push rod of the gun. The connection means may be an external thread arranged on a spigot extending from the end of the capsule. In order to rotate these capsules about their length to screw them on and off their carriers, flat faces in the form of a circumscribed polygon are provided on their outer peripheries for receiving the end of a box spanner.

In comparison with the volume of radioactive material, which amounts to only a few cubic millimeters, the dimensions of the previously known capsules are disproportionately large both in the longitudinal and transverse dimensions. Consequently the passageway in the gun, for example the axial bore in the first part of the shield in the novel gun described, accommodating the capsule, has had to be suitably widened. In order to apply a box spanner to the capsule when it is in position in its passageway, the passageway must also be wider by the thickness of the spanner wall to enable this spanner to grasp the flat faces of the capsule. Since the passageway which contains the capsule is, in use, surrounded by a protective shield having a minimum thickness of radiation absorbing material, any increase in the diameter of the capsule passageway produces a corresponding increase in the size and weight of the protective shield.

The invention also includes a capsule for use in the above novel gun, the capsule comprising an elongated cylindrical body consisting of two parts which screw together and enclose a cavity for a gamma ray source between them, one part of the body being provided with flat faces set in from the cylindrical wall of the capsule for receiving a tool for turning the capsule about its axis and the other part being provided with means for affixing the capsule to the capsule carrier of a gamma ray gun with which the capsule is used wherein one or other of the parts is formed with a blind axial hole the blind end of which forms the cavity and which is tapped to receive an externally screw threaded spigot on the other part of the body.

In this way, with a conventional cavity diameter of about 3 mm., a substantially cylindrical capsule is obtained, the outer diameter of which is not more than approximately 5 mm. at any point and which can be turned about its length and therefore moved within the passageway in which it is used by means of a tool such as a spanner or a pair of pliers which need not have a transverse dimension larger than the diameter of the capsule. This is an important advance when compared with conventional capsules which usually require a passageway having a diameter of approximately 10 mm. to accommodate them. In order to prevent the periphery of the capsule from being enlarged by any solder or welding flux which is supplied to seal the two parts of the capsule together, the capsule is preferably provided with an annular groove which extends on both sides of the external line of contact between the two parts around the body, which line is utilized for solder or a weld to seal the joint between the two parts.

The part of the capsule which is provided for affixing the capsule to a carrier, may be provided with a number of conventional components such as a screw thread, a plate or a strap having an eye, a coupling cone, or a threaded sleeve or pin. In this way, a capsule can be employed in a number of different types of gun.

Tungsten is a particularly suitable material for the protective shield of the gun, for the plug which fills the passageway in the cap, for the locking bolt which passes through the plug and for the capsule because of the smaller volume and weight of material required in comparison with lead. For example, only 24 kgms. of tungsten is required to form the protective shield in the gun and having a wall thickness sufficient to screen 50-curie iridium 192. Further investigation has shown, however, by using uranium instead of tungsten, a further reduction in size of the gun and a decrease in its weight to about 15 kgms. or even less can be obtained. The shaping and working of uranium does not offer any special difficulties. In addition, its natural radiation is negligible in comparison with the permissible human radiation dosage and can be reduced still further by means of a thin protective shell surrounding the protective shield of uranium. If the capsule for containing the radioactive material which is to form the source of gamma rays, is also made exclusively of uranium rather than of conventional less absorbent material, the wall thickness of the first part of the protective shield which extends behind the capsule in the bore in this part of the shield can be reduced by approximately the length of that part of the capsule which is connected to the capsule carrier.

One example of a gamma ray gun with two modified forms of capsule, and constructed in accordance with the present invention is illustrated in the accompanying drawings, in which:

FIGURE 4 shows the gun of FIGURE 1 with the cap in its closed position, partly in side elevation and partly in central vertical longitudinal section;

FIGURE 5 is a front end elevation of the upper part of the gun of FIGURE 1 with the cap closed;

FIGURE 6 is an elevation of the upper part of the other end of the gun of FIGURE 1;

FIGURE 7 is an axial section through a rack-and-pinion drive for the cap plug of the gun of FIGURE 1;

FIGURE 8 illustrates a capsule of the present invention for a gamma ray source on a larger scale, partly in side elevation and partly in central longitudinal section;

FIGURE 9 is a front elevation of the capsule of FIGURE 8; and

FIGURE 10 is a view to that of FIGURE 8 but of a modified form of capsule.

Figure 1:
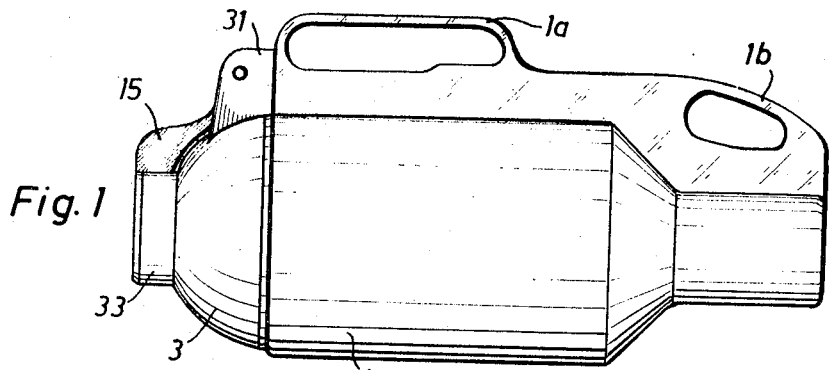
FIGURE 1 is a side elevation of the gun when closed.

The gun includes a thick protective shield of uranium surrounding a capsule 11 which, in use, contains a radioactive material which emits gamma rays. The protective shield which is radiation-absorbing to a high degree consists of two parts, a hemispherical cap 3 and a block 2 fixed in the end of a cylindrical outer casing 1. The substantially planar area of contact between the parts 2 and 3 approximately coincides with the end of the cylindrical casing. The cap 3 of the protective shield is guided so as to be longitudinally displaceable in the casing 1 by means of a hollow cylindrical extension 6 in such a way that the cylindrical extension 6 is almost completely within the casing 1 when the parts 3 and 2 of the protective shield are close up against one another. The surfaces of these parts which face, and, in the closed position, engage one another are off-set in opposite directions to form shallow steps, so that they do not form a continuous planar joint. By pushing the cap 3 away from the casing 1 axially, a gap is formed between the cap and the other part of the protective shield (see FIGURE 2) and the capsule 11 can be pushed. The cap and the capsule are moved by a pneumatic or hydraulic drive. Fluid under pressure can be introduced by way of a pipe (not shown) and a screw connection 23 into a chamber 9 arranged in the casing 1. This chamber 9 is in communication with the pressure pipe connection 23 by way of a duct 24 and is defined by a larger annular piston 21 and a smaller piston 22, both of which are slidable along the longitudinal axis of the casing, but independently of one another. The piston 21 is guided in a cylinder 29 and is secured to one end of a sleeve 4 which can be moved against the action of a spring 5 until it comes into contact with an abutment surface 2a of the block 2 of the protective shield. This spring 5 is supported at one end against a part 30 of the casing which carries the block 2 of the protective shield and at the other end against the piston 21. A thrust piece 7 is connected to the sleeve 4 by way of another sleeve 4a surrounding the spring 5. This sleeve 4a also provides support for the spring 5 so that the spring produces an adequate restoring force in the event of breakage. The thrust piece 7 is coupled to the guide extension 6 of the cap by way of a two-part rotary slide comprising parts 16, 16a. To this end, an entraining pin 7a provided on the thrust piece 7 extends through a longitudinal slot in the casing 1 and engages the rotary slide 16, 16a which is rotatable and longitudinally displaceable in a bearing guide 1c of the casing 1. The rotary slide in turn engages by means of an external projection 16b, which extends back through the longitudinal slot in the casing 1, in a recess in the guide extension 6. Thus, in the position of the rotary slide 16, 16a shown in FIGURE 1, the cap is carried along by the thrust piece 7 in both of its directions of movement. Upon the introduction of fluid into the chamber 9 under a pressure sufficient to overcome the force of the spring 5, the cap 3 is pushed away from the block 2 of the protective shield until the sleeve 4 comes into contact with the abutment surface 2a. A disc-shaped gap is then formed between the parts 2 and 3 of the protective shield, the width of the gap corresponding to the distance which the sleeve 4 has been displaced.

Figure 2:
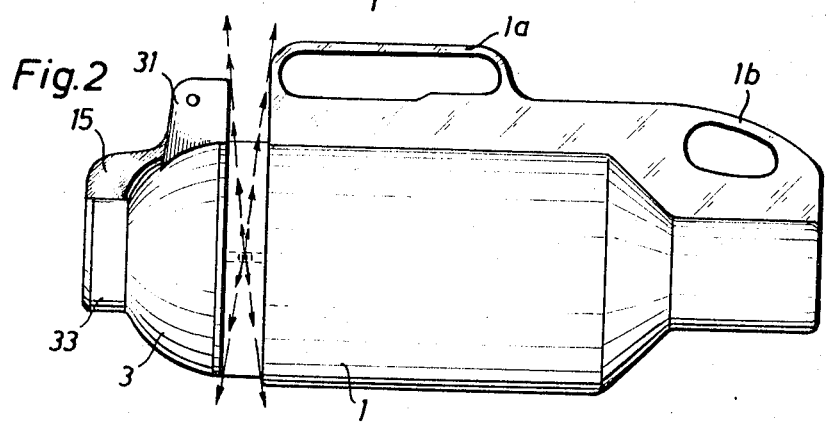
FIGURE 2 is a side elevation of the gun of FIGURE 1 with its protective cap in the open position and the capsule exposed.

The capsule 11 containing the gamma ray source is pushed into the center of the gap as the cap 3 is pushed away. The piston 22 which is displaceable in the sleeve 4 against action of a second spring 8 pushes the capsule 11 into the gap, the capsule 11 being connected to the piston by way of a push rod 12 projecting into an axial bore 10 in the block 2 of the protective shield. The spring force opposing any displacement of the piston 22 is greater than the force exerted by the spring 5 on the piston 21. Consequently, since the area of the piston 22 exposed to the fluid in the chamber 9 is less than that of the piston 21, the capsule 11 is not pushed into the gap between the parts 2 and 3 of the protective shield unil after the gap has been opened; and the capsule is retracted into the block 2 of the protective shield when the fluid pressure in the chamber 9 is released before the gap closes. By slight modification, however, the apparatus may also be so designed that a push rod carrying the capsule 11 is not carried along by the sleeve 4. A stop pin 13 projecting from the cap 3 extends into the bore 10 and so limits the distance by which the capsule 11 is displaced and ensures that the capsule or radiator is located exactly in the center of the gap. The open gap is covered by the cap guide 6 and is consequently reliably protected against the penetration of dust and foreign bodies, which could prevent complete reclosing of the gap. The extension 6 does not of course absorb any of the gamma rays to any appreciable extent so that the gun produces an annular beam of rays substantially in the plane of the gaps as shown in FIGURE 2. In the region of the open gap, the guide 6 has on its outside an annular coating 6a of warning paint which, when the gap is closed, is inside the casing 1 and invisible.

In order to be able to carry out testing of workpieces not only by means of radiation emitted transversely of the axis of the gun through the disc-shaped gap, but also by means of radiation emitted in the axial direction in the form of a cone, with the gap closed, the cap 3 is provided with a uranium plug 14. The plug 14 is engaged to be swung out of an outwardly widening bore, which it just fills, in the cap 3. This plug 14 is mounted on an arm 15 which is pivoted between side plates 31 on the cap and carries a pinion 18 around its pivot axis. This pinion can be so coupled with the thrust piece 7 by way of rotary slide 16, 16a that, on the thrust piece being pushed forward, the lever 15 is swung out upwardly and the plug 14 is swung out of the cap. On subsequent retraction of the thrust piece, the plug 14 is again swung into the cap. To couple the plug 14 with the thrust piece 7, the rotary slide 16, 16a is first turned through about 90° from the position shown in FIGURE 4 and then pushed forward against a stop until the end of a rack 17 provided on the inner part 16 of the rotary slide is level with the pinion 18. By further rotation of the part 16 of the slide this rack 17 is then brought into engagement with the pinion. During the first part of the rotation of slide, the projection 16b on the sleeve-shaped part 16a of the rotary slide is swung out of the cap guide 6, so that the latter is uncoupled from the thrust piece 7. On the further rotation of the rotary slide, which has meanwhile been pushed forward, a projection 16c on the sleeve 16a of the rotary slide engages behind a shoulder 26 on the block 2 of the protective shield and a projection 16d on the sleeve 16a engages in front of a shoulder 6b on the cap guide 6. These projections 16c and 16d lock the cap guide 6, and thereby also the cap 3 itself, to the casing 1. On fluid pressure being introduced into the chamber 9, only the plug 14 is therefore swung out of the cap by way of the thrust piece 7, and any opening of the gap behind the cap is precluded.

Figure 3:
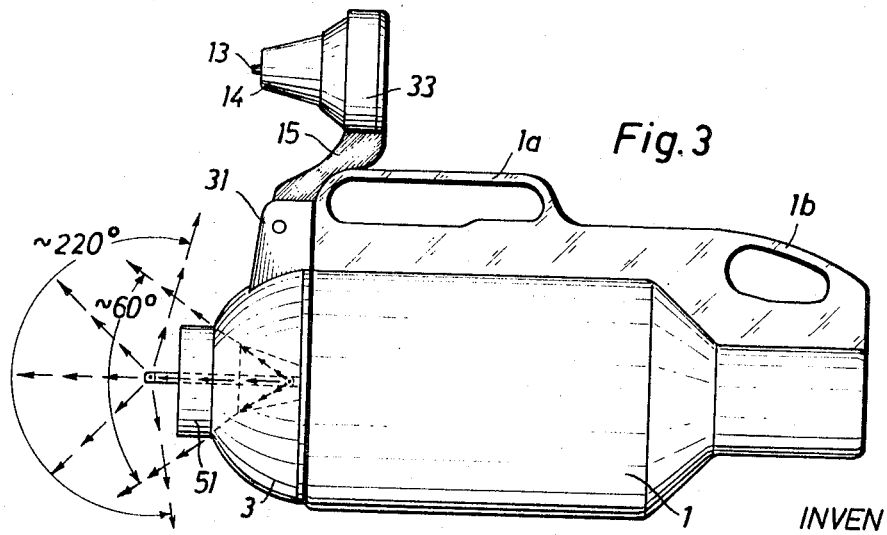
FIGURE 3 is a side elevation of the gun of FIGURE 1 with the cap in its closed position but the plug swung out of the cap, two different working positions of the capsule being shown.

After the plug has been swung out, the radioactive material in the capsule emits gamma rays outwards in the axial direction in a conical beam. The angle of the core is determined by the width of the bore 10 extending through the block 2 and the position of the capsule 11 in the bore. The angle of the conical beam can be enlarged continuously by moving the capsule 11 along the bore 10 towards the cap 3, out of the bore 10 into the interior of the cap and finally right out of the cap as shown in FIGURE 3. Upon the pressure of the fluid in the chamber 9 being decreased again, the capsule returns to its position within the block 2 and the plug 14 is swung into the cap 3 again, whereupon the capsule or radiator is again enclosed by its radiation-absorbing shield.

A bolt 19 which is also made of uranium, serves to secure the plug 14 in the cap, the bolt extending through an axial bore in the plug 14 and being coupled with the cap by means of a bayonet connection. The plug 14 can therefore be swung out of the cap only after the bolt 19 has been brought out of engagement with the cap 3 by twisting about its axis. The operative position of the plug 14 may also be indicated by a warning paint which is otherwise not visible. This paint, for example, may be on the outer surface of a ring 51 (see FIGURE 3) fitted on the outside of the cap 3, the ring surrounding the mouth of the bore of the cap and being covered by a hood 33 which is swung out with the plug 14.

By withdrawing the locking bolt 19 from the gun when it is otherwise closed, a narrow cylindrical passage is created through which the radiating material emits useful radiation in the form of a narrow pencil of rays from the capsule in its undisplaced position within the block 2. This may be desirable, for instance, for radiometric purposes. When the bolt has been withdrawn, the capsule can also be replaced in its position of rest by means of a tool which is introduced through the plug 14 and into the bore 10.

An additional safety locking device, ensures that the bolt 19 is accessible only when the pinion 18 is in mesh with the rack 17 on the rotary slide. This locking device consists of a slide or flap 32 which closes an opening in the hood 33 covering the bolt head 19a and is secured by a spring-loaded locking pin 34 against displacement from its closed position when the end of a double-armed safety lever 35 rests against this locking pin. This double lever 35 releases the locking pin 34 only when it has been swung out of its position of rest by a dog 36 mounted on the rotary slide 16. The dog 36 is disposed on the back of the rack 17 and therefore swings the safety lever 35 out of the locking position simultaneously with the swinging of the rack 17 into the pinion 18.

Although the capsule is surrounded by the protective shield on all sides unless fluid and sufficiently high pressure is introduced into the chamber 9, an additional safety device is provided which overrides the application of fluid under a pressure otherwise sufficient to overcome the forces of the springs 5 and 8. This safety device includes a locking member 20 is used which is slidable together with a piston 26 in a cylinder 27 connected to the casing 1 against the action of a spring 28. This locking member 20 engages in an extension 7b of the thrust piece and prevents the displacement of the thrust piece from its rest position. The space behind the piston 26 is in communication with the fluid inlet 23 by way of a pipe 25.

Electrical signalling to a remote place of the inoperative positions of the gun is provided for. Depending on which of the contacts 37a and 37b of a switch box 37 is touched by an abutment 38 on the extension 7b of the thrust piece 7, a signal indicating the state of the apparatus at any given time is transmitted by way of a cable from the switch box 37, for example to one of a number of signal lamps.

The capsule, which is shown in greater detail in FIGURES 8, 9 and 10, comprises a part 39 containing a cavity 41 for receiving radioactive material which emits gamma rays. This cavity 41 forms the end of an axial hole part of which is tapped to receive a threaded spigot 42 of another part 40 of the capsule. The end face of the spigot 42 closes the cavity 41 completely. On both sides of the joint 43 between the parts 39 and 40 of the capsule there extends an annular groove 44 which accommodates the solder or a weld 45 forming a gas and water-tight seal between the parts 39 and 40 without the sealing material projecting radially outwards of the periphery of the capsule. On the part 39 of the capsule there are provided two opposite flat faces 46 which are recessed to such an extent with respect to the periphery of the capsule the capsule can be gripped by a tool such as a pair of pliers which need not have a diameter larger than that of the capsule.

In the capsule shown in FIGURE 8, the part 40 of the capsule has an external thread 48 on its end 47 remote from the part 39 and of reduced cross-section. The external thread 48 is utilized to threadedly couple the capsule into a threaded bore in the capsule carrier or push rod 12 of the illustrated gun. A coupling device could be alternatively interposed between the capsule and its carrier.

In the slightly modified capsule shown in FIGURE 10, a part 40a of the capsule is provided with a bore 49 formed with a screw thread 50 by means of which the capsule can be threadedly coupled onto a threaded spigot of its carrier or of an interposed coupling device. The capsule shown in FIGURE 10, is cylindrical over almost its entire length and this feature enables the capsule to be particularly well supported in a cylindrical bore of the gun with which it is used. As a result, the screwing together of the capsule and its carrier by means of a tool inserted in the bore is facilitated.

The gun is also provided with handles 1a and 1b for handling the gun during transport and for manipulating it when it is mounted on a suitable carrier, for example a stand or tripod.

We claim:

1. A gamma ray gun for use in testing workpieces, said gun comprising a protective shield of material which absorbs ionizing radiation and which surrounds a capsule for containing a source of gamma rays, the shield being in two parts separated by a substantial plane of division lying across the end of the casing with one of the parts fixed in the casing and the second part connected to the casing so that it can be moved in the axial direction of the casing away from and towards the first part of the shield between abutments which limit its movement; a cylindrical sleeve which is mounted coaxially in the casing and which is movable in the axial direction against the action of a spring upon the application of fluid under pressure to a chamber within the casing, the sleeve being surrounded by a thrust piece which it carries with it in both directions of movement and which is connected to the second part of the protective shield so that when the sleeve is moved by the fluid pressure the second part of the shield is moved away from the first part to produce a disc shaped gap; and a push rod which is moved coaxially within the sleeve and within a central bore in the first part of the shield against the action of a second spring when the fluid is supplied to the chamber under a greater pressure than that required to move the sleeve against the first spring, to move a capsule which is detachably mounted at the end of the push rod out of the bore in the first part of the shield and into a position in which the capsule is situated in the gap between the two parts of the protective shield.

2. A gun as claimed in claim 1, wherein the second part of the protective shield is a hemispherical cap provided with a projection which extends into the axial bore in the first part of the shield when the two parts of the shield are together but which, when the two parts are apart to form the gap, acts as a stop for positioning the capsule at the center of the gap.

3. A gun as claimed in claim 1, wherein the second part of the protective shield is formed with a central passageway which extends completely through it and diverges in the axial direction of the casing away from the end of the axial bore in the first part of the shield, a plug of material normally closing said passageway, said plug of material being absorbent of ionizing radiation and being carried on the end of an arm which is pivotally connected to the second part of the shield and which carries a fixed pinion engageable by a rack formed on a rotatable slide that moves longitudinally along the casing when said slide is rotated into one position said slide couples said thrust piece to the second part of the shield in such a manner that movement of said sleeve against the action of its spring causes the second part of the shield and said plug to move bodily away from the first part of said shield to open the gap, but when said slide is rotated to a second position, it locks the two parts of the protective shield together and couples said thrust piece to said pinion so that when the sleeve is then moved against the action of its spring said rack causes said pinion and arm to be pivoted and said plug to be withdrawn from the passageway in the second part of the protective shield.

4. A gun as claimed in claim 1, further comprising a spring loaded locking device for locking said thrust piece against moving in said casing, said locking device being disengageable by the application of the fluid under pressure to the chamber in said casing.

5. A gun as claimed in claim 1, wherein said first spring surrounds said sleeve and said spring is surrounded by a second sleeve which both supports said spring against said first-mentioned sleeve and transmits the movement of said first-mentioned sleeve to said thrust piece.

6. A gun as claimed in claim 1, wherein the second part of said protective shield is mounted on said casing by means of a hollow cylindrical shell extension which surrounds the first part of said shield and closes the periphery of the gap between the two parts.

7. A gun as claimed in claim 6, wherein the outer surface of the part of the cylindrical shell which surrounds the gap when the second part of said shield is moved away from the first part of said shield is distinctively colored and slides into said casing when said gap is closed so that if any of the colored portion of the shell is visible beyond the end of said casing it indicates that the two parts of said protective shield are not close together.

8. A gun as claimed in claim 3, further comprising an outwardly projecting ring surrounding the wider end of the passageway through the second part of said protective shield and a hood covering said outwardly projecting ring and connected to the plug when said plug is in position within said bore, the outer surface of said ring being distinctively colored so that if any of the colored portion of said ring is visible, it indicates that the plug is not fully home within the passageway.

9. A gun as claimed in claim 7, wherein said colored portion is provided by a paint which becomes luminous when exposed to ionizing radiation.

10. A gun as claimed in claim 3, wherein said plug has a central bore formed therethrough and further comprising a bolt extending through said central bore for locking said plug in said passageway, said bolt having a bolt head, a hood arm, a hood normally covering said bolt head, said hood being mounted in said hood arm and having an aperture formed therein through which said bolt head is accessible, and a closure plate normally closing the aperture of said hood, said closure plate being locked in position except when said rack is in engagement with said pinion.

11. A gun as claimed in claim 1, wherein said protective shield and ionizing radiation absorbent parts consist of uranium.

12. A gun as claimed in claim 1, further comprising a capsule carrier, and wherein said capsule comprises an elongated cylindrical body consisting of two parts threadedly coupled together and enclosing a cavity for a gamma ray source between them, one of said parts of said body being provided with flat faces set in from the cylindrical wall of said capsule for receiving a tool for turning said capsule about its axis and affixing means in the other of said parts of said body, said affixing means affixing said capsule to said capsule carrier of said gamma ray gun one of said parts of said body having a blind-ended axial hole formed therein, the blind end of said blind axial hole forming said cavity and being threaded to receive an externally threaded spigot on the other of said parts of said body.

13. A gun as claimed in claim 12, wherein said capsule has an annular groove which extends on both sides of the external line of contact between said two parts of said body, said annular groove being formed around said body for receiving solder or a weld to seal the joint between said two parts.

14. A gun as claimed in claim 12, wherein said capsule includes in the end remote from the cavity of the part of said body which is formed with said spigot threading for providing a threaded coupling with said capsule carrier.

15. A gun as claimed in claim 12, wherein the part of said body formed with said spigot is made of a material which absorbs ionizing radiation.

References Cited by the Examiner
UNITED STATES PATENTS 2,876,363   3/1959   Forrer et al. _____ 250—106
2,891,168   6/1959   Goertz et al. _____ 250—106

ARCHIE R. BORCHELT, Primary Examiner.
RALPH G. NILSON, Examiner.